United States Patent [19]

Schoen et al.

[11] 3,957,639
[45] May 18, 1976

[54] FLUID FLOW MODULATOR

[75] Inventors: Donald W. Schoen, St. Paul; James M. Silvernail, Minneapolis, both of Minn.

[73] Assignee: Donaldson Company, Inc., Minneapolis, Minn.

[22] Filed: Jan. 14, 1975

[21] Appl. No.: 540,842

[52] U.S. Cl. .................................. 210/107; 55/215; 55/272; 55/294; 55/459 R; 137/625.12
[51] Int. Cl.² ........................................ B01D 46/04
[58] Field of Search ........... 210/107, 143, 332, 333, 210/334; 55/218, 213, 215, 283, 287, 272, 294, 302, 459; 137/625.12, 625.13, 624.42; 251/252

[56] References Cited
UNITED STATES PATENTS

| | | | |
|---|---|---|---|
| 2,055,874 | 9/1936 | Manning | 210/107 |
| 2,500,747 | 3/1950 | Ellis | 55/294 |
| 2,584,746 | 2/1952 | Sheldon | 55/294 |
| 2,796,146 | 6/1957 | Hersey | 55/294 |
| 3,234,714 | 2/1966 | Rymer | 55/294 |
| 3,360,907 | 1/1968 | Clark, Jr. | 55/283 |
| 3,392,835 | 7/1968 | Asner | 210/333.1 |
| 3,395,517 | 8/1968 | Lang et al. | 55/285 |
| 3,541,764 | 11/1970 | Astrom | 55/302 |
| 3,616,614 | 11/1971 | Eisenegger | 55/294 |
| 3,757,497 | 9/1973 | Ray | 55/302 |

*Primary Examiner*—John Adee
*Attorney, Agent, or Firm*—Merchant, Gould, Smith, Edell Welter and Schmidt

[57] ABSTRACT

A control mechanism for apparatus for cleaning of fluid filters by a jet of fluid directed toward a filter in a direction reversed to that of the flow of fluid to be filtered through the filter element. An elongated manifold extends across the downstream or clean fluid delivery side of the filter element, and has a plurality of aligned apertures extending longitudinally of the manifold and facing the adjacent side of the filter element. A plurality of valve elements are mounted in the manifold for movement toward and away from closing relationship with the apertures, and are yieldingly urged toward closing relationship with their respective apertures. A rotary cam shaft is journaled in the manifold and includes a plurality of cams each associated with a different valve element. A pawl and ratchet arrangement is operative to open each of the valves in succession responsive to movement of the manifold across the side of the filter element. The cam arrangement is such that only one valve element is open at any one given time during the filter cleaning operation.

14 Claims, 9 Drawing Figures

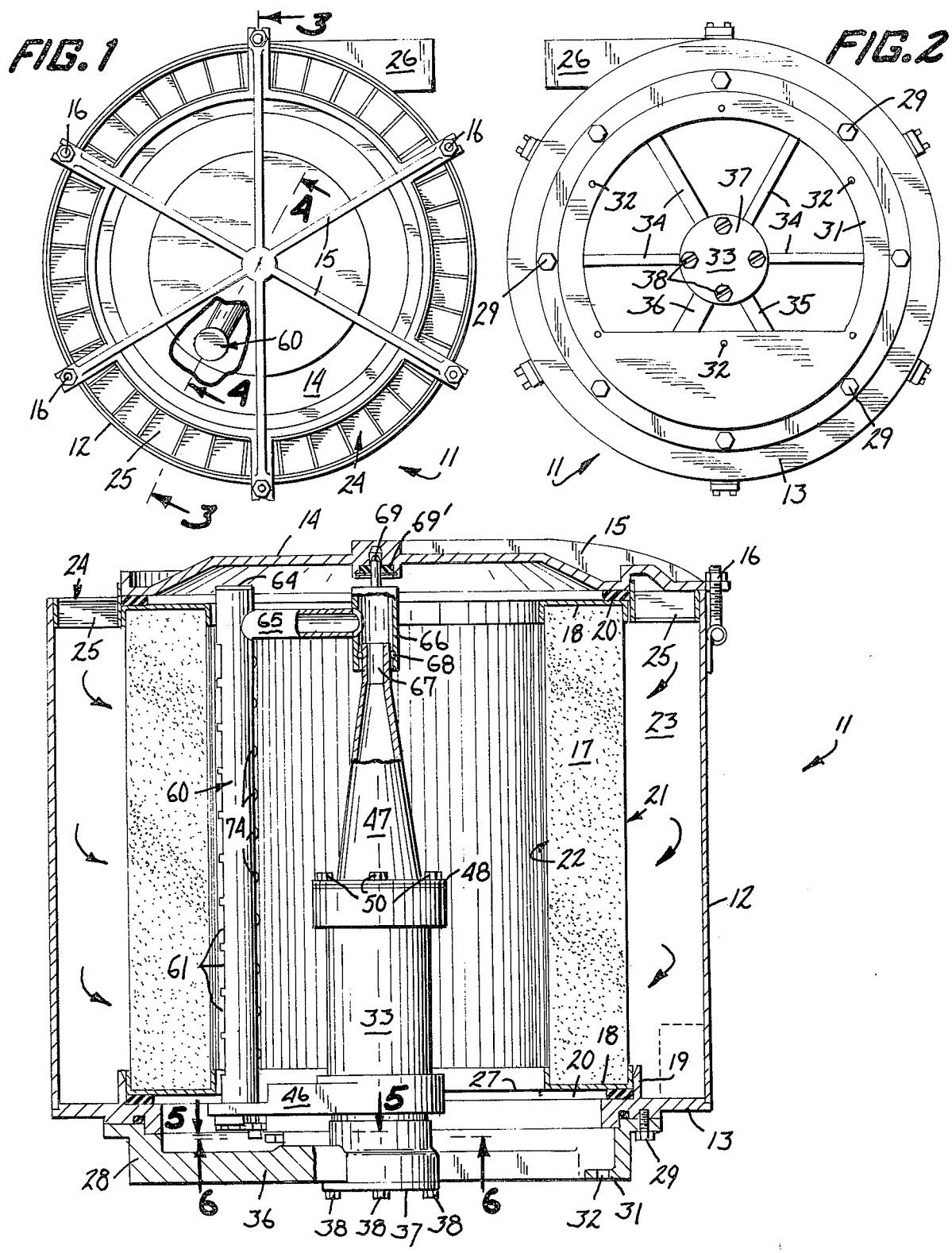

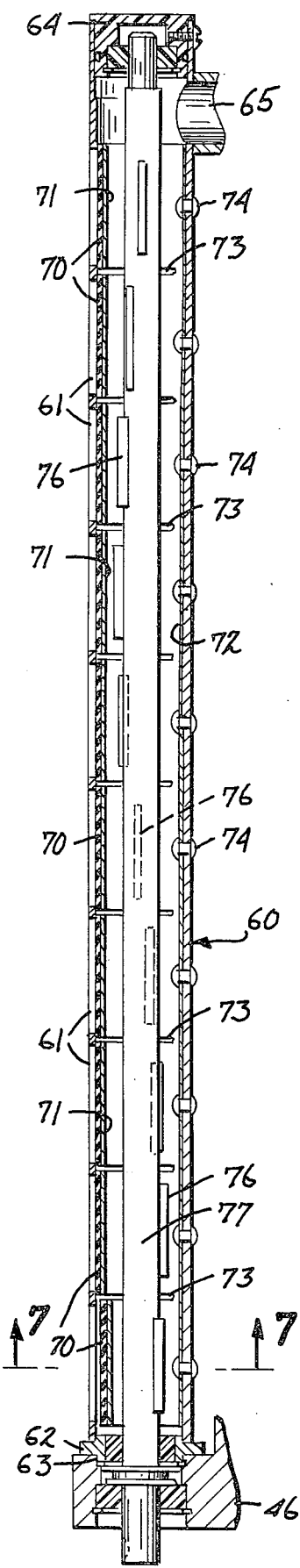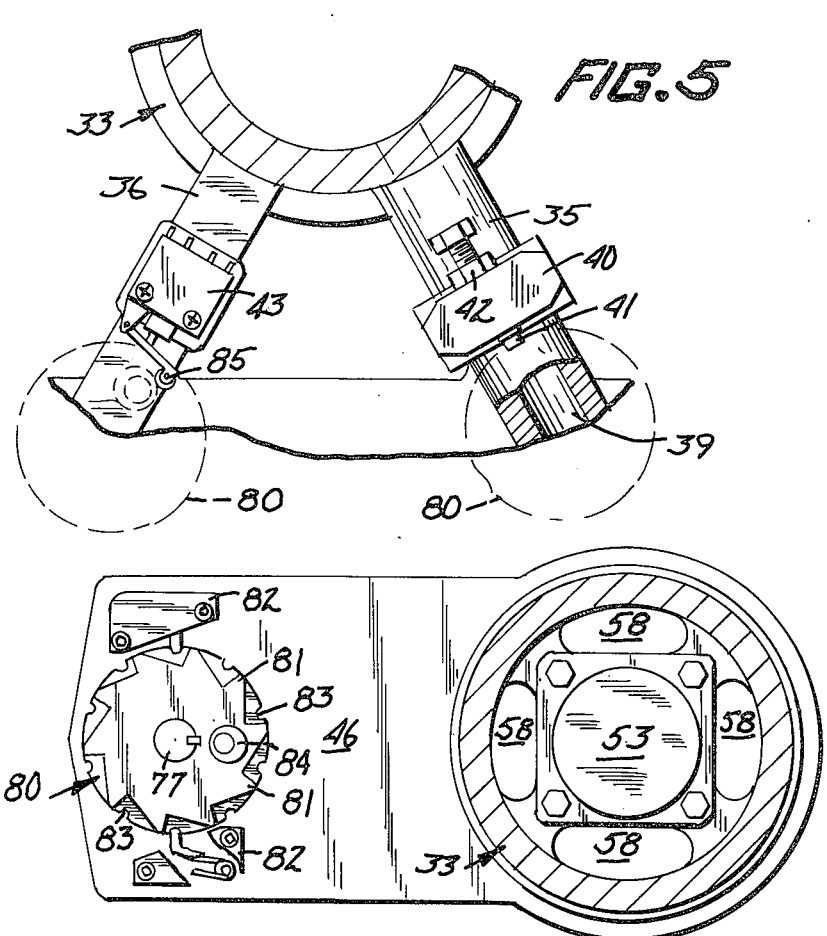

FLUID FLOW MODULATOR

The invention herein described was made in the course of a contract with the U.S. Army Tank-Automotive Command.

This invention relates generally to self-cleaning fluid filters, such as air filters, and more particularly to air filter cleaning mechanism including a fluid flow modulator arrangement providing for sequential cleaning of given areas of a filter element during the normal filtering operation of the element, and without unduly disturbing the normal filtering operation. Further, this invention is in the nature of an improvement over fluid flow modulators wherein a modulator tube is telescopically rotatively received in a tubular manifold, the manifold having a longitudinally extending discharge slot cooperating with one or mor helically extending slots in the modulator tube to define a relatively small discharge opening which moves longitudinally of the manifold responsive to rotation of the modulator tube. Problems with this and similar types of modulators involve maintenance of close machining tolerances in the fabrication thereof, bending or deflection of the parts in use and due to vibration, and loss of smoothness of operation due to contamination.

The form of the fluid flow modulator illustrated is adapted for use with annular filter elements as well as generally flat filter elements, and involves fluid delivery means for delivering a jet flow of fluid, such as air, against the discharge or downstream side of a filter element in a direction reverse to that of the flow of fluid to be filtered, through the filter element, the fluid delivery means including an elongated manifold extending in a direction across the downstream side of the filter element. The manifold defines slot-like aperture means extending longitudinally of the manifold and facing the adjacent side of the filter element. Means is also provided for imparting movement to the manifold over the adjacent side of the filter element. The fluid flow modulator comprises a plurality of valve elements each operatively associated with the aperture means and individually movable toward and away from aperture closing relationship with different portions of the aperture means. Mechanism is included for imparting valve opening movement to the valve elements in a given succession responsive to movement of the manifold relative to the filter element.

BRIEF DESCRIPTION OF THE DRAWINGS

FIG. 1 is a view in top plan of an air cleaner containing the fluid flow modulator structure of this invention;

FIG. 2 is a view in bottom plan;

FIG. 3 is an enlarged axial section taken on the line 3—3 of FIG. 1;

FIG. 4 is an enlarged fragmentary section taken on the line 4—4 of FIG. 1;

FIG. 5 is an enlarged fragmentary view partly in plan and partly in section, taken on the line 5—5 of FIG. 3;

FIG. 6 is a view partly in bottom plan and partly in section, taken on the line 6—6 of FIG. 3, some parts being broken away;

FIG. 7 is an enlarged transverse section taken on the line 7—7 of FIG. 4;

DETAILED DESCRIPTION OF THE PREFERRED EMBODIMENT

Figure 8:
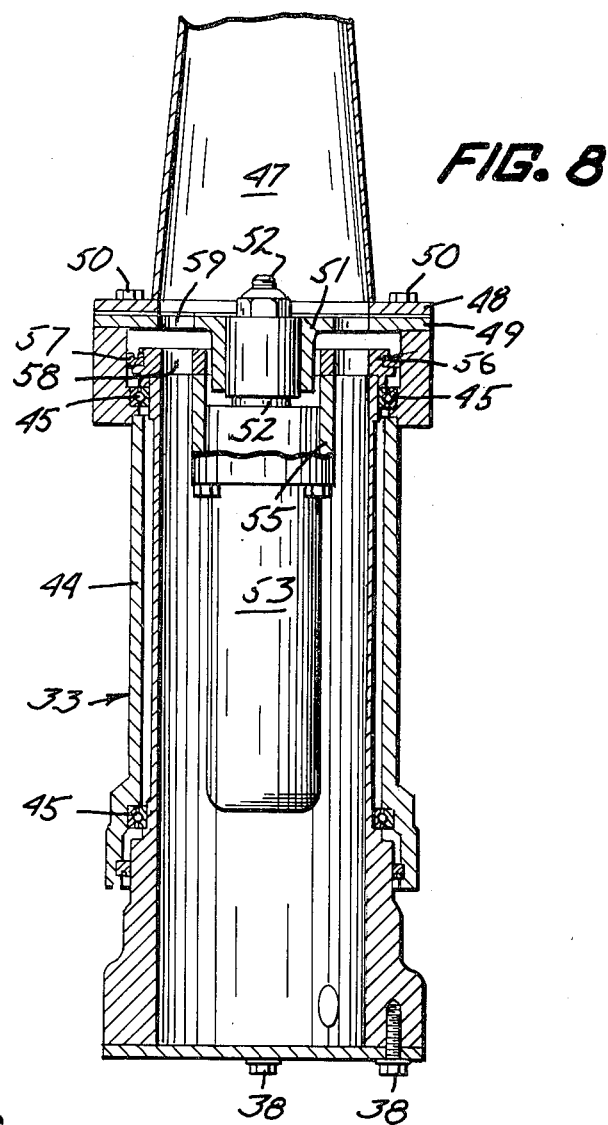
FIG. 8 is a fragmentary axial section taken on the line 8—8 of FIG. 3.

The present invention is applicable to fluid filters for various fluids, liquid or gaseous, and is shown in the drawings and will be hereinafter described in connection with an air cleaner of the type used in connection with internal combustion engines. The air cleaner shown is indicated in its entirety at 11 and comprises a generally cylindrical housing having a cylindrical wall 12, an annular bottom wall 13 to which the lower and of the cylindrical wall 12 is welded or otherwise rigidly secured, and a top wall 14. The top wall 14 is of less diameter than the annular bottom wall 13 and is provided with radially outwardly projecting ribs 15 that are slotted at their outer ends to received nut equipped locking bolts 16 by means of which the top wall 14 is removably secured to the upper end of the cylindrical wall 12. The bolts 16 are pivotally secured to the cylindrical wall 12. A generally cylindrical filter element 17 is mounted between a pair of annular end plates 18, the filter assembly being clamped between the top and bottom housing walls by means of the screws 16. The bottom wall 13 is provided with an upwardly projecting cylindrical flange 19 which centers the filter element 17 within the housing, sealing washers 20 being interposed between the opposite end plates 18 and the bottom and top walls 13 and 14 respectively. The filter element 17 may be of any well known and commercially available construction, the element shown being a cylinder of pleated porous sheet material and having a radially outer air receiving or upstream side 21 and a radially inner filtered air delivery or downstream side 22. The housing walls 12 and 13 and filter element 17 cooperate to define an annular inlet chamber 23 that is open at its upper end. An annular deflector 24 is mounted in the open upper end of the inlet chamber 23 and includes a plurality of circumferentially spaced vanes 25 that direct air entering the inlet chamber 23 in a helical path, as shown by arrows in FIG. 3. At its lower end, the cylindrical wall 12 is formed to provide an outlet passageway 26 for removal of particles separated out of the swirling air stream in the inlet chamber 23 by centrifugal force. The bottom wall 13 defines a large central opening 27 for discharge of filtered air from the cleaner 11.

A circular base member 28 is secured to the bottom wall 13 by machine screws or the like 29, and defines an opening 30 that communicates with the central opening 27 in the bottom wall 13. The base member 28 is formed to provide a flange 31 having a plurality of circumferentially spaced openings 32 by means of which the air cleaner 11 may be mounted on a carburetor, not shown, or any other device to which clean air or gas is to be delivered. It will be appreciated that such a device or apparatus will include means for drawing air through the air cleaner 11.

The base member 28 includes a central tubular leg 33 and spokes 34, 35 and 36 extending radially outwardly from the bottom portion of the leg 33. The lower end of the leg 33 is closed by a removable cover plate 37 secured thereto by machine screws of the like 38. The spoke 35 has an air passageway 39 extending longitudinally therethrough which communicates with the interior of the leg 33 for delivery of air under pressure from a suitable source of supply, not shown. Further, the leg 35 is formed to provide a mounting lug 40 on which is mounted an adjustable pawl 41. The pawl 41 is in the nature of a machine screw that is screw threaded in the mounting lug 40 and provided with a lock nut 42, see FIG. 5. With further reference to FIGS. 3 and 5, it will be seen that an electrical switch 43 is mounted on the spoke 36. The purpose of the pawl 41 and switch 43 will hereinafter become apparent.

The tubular leg 33 is coaxial with the filter element 17 and cylindrical housing wall 12, and has journaled thereon a tubular body 44, by means of rolling friction bearings 45. The body 44 includes an arm portion 46 that projects radially outwardly from its lower end. A frusto-conical air conduit 47 has a radially outwardly projecting circumferential flange 48 at its lower end that overlies a coupling plate 49 that is interposed between the flange 48 and the upper end of the tubular 44. The conduit 47 is coaxial with the tubular body 44 and, with the coupling plate 49, is rigidly secured to the upper end of the body 44 by machine screws or the like 50. The coupling plate 49 is formed to provide a hollow central boss 51 that is secured to the drive shaft 52 of a motor 53, by means of a conventional coupling bushing 54. The motor 53 is bolted or otherwise rigidly secured to a top wall portion 55 of the tubular leg 33. A bearing retainer 56 is mounted on the upper end of the leg 33, and is provided with a circumferential seal 57 that engages the upper end portion body 44. The retainer member 56 and top wall portion 55 have axially extending openings 58 therethrough that cooperate with similar openings 59 in the coupling plate 49 to effect communication between the interior of the tubular leg 33 and conduit 47.

An elongated tubular manifold 60 is disposed within the space defined by the inner side 22 of the filter element 17 on an axis parallel to the axis of the filter element 17, the manifold 60 defining a plurality of fluid discharge apertures 61 that are elongated in a direction longitudinally of the manifold 60 and aligned so as to provide a row thereof, the row extending longitudinally of the manifold 60. The manifold 60 is disposed in closely spaced engagement to the inner or downstream side 22 of the filter element 17, the slot-like apertures 61 being disposed to direct air from the interior of the manifold 60 radially outwardly toward the inner downstream side 22 of the filtee element 17. At its lower end, the manifold 60 is rigidly secured to a mounting flange 62 that is in turn rigidly secured to the radially outer end of the radial arm portion 46, the mounting flange 62 having a portion extending into an opening 63 in the arm portion 46. At its upper end, the manifold 60 is closed by a cap 64. A tubular arm 65 is rigidly secured over an opening in the manifold 60 in downwardly spaced relation to the cap 64 and extends radially inwardly from the manifold 60, the inner end of the arm 65 being welded or otherwise rigidly secured to a fitting 66 that is disposed on the axis of the tubular leg 33 and air conduit 47. The lower end portion of the fitting 66 encompasses a tubular upper end portion 67 of the air conduit 47 and is sealingly coupled thereto by a conventional sealing ring 68. The tubular arm 65 and fitting 66 establish communication between the air concuit 47 and the interior of the manifold 60, as shown particularly in FIGS. 3 and 4. At its upper end, the fitting 66 has an axially upwardly extending pilot pin 69 that is journaled in a bearing 69 mounted in the central portion of the top wall 14.

Each of the discharge apertures 61 is normally closed by a different one of a plurality of valve elements 70 disposed within the manifold 60 and mounted on leaf springs 71. In the embodiment illustrated, the springs 71 are integral parts of an elongated sheet 72 of resilient metal slotted at longitudinally spaced intervals, as indicated at 73. As shown in FIGS. 4 and 7, the sheet 72 is mounted within the manifold 60 by longitudinally spaced rivets or the like 74. Each of the springs 71 yieldingly urges its respective valve element 70 into aperture closing relationship with a respective one of the apertures 61.

Each of the springs 71 is formed to provide a cam follower portion 75 that is positioned to be engaged by one of a plurality of cams 76 mounted on a cam shaft 77 that extends axially through the manifold 60 and which is journaled in bearings 78 in the upper end portion of the manifold 60 and in the opening 63 of the radial arm 46, see particularly FIG. 4. A sealing bushing 79 encompasses the cam shaft 77 within the mounting flange 62. Each cam 76 is angularly displaced on the cam shaft 77 from an adjacent cam 76, so that the cams 76 are disposed in a helical arrangement on the cam shaft 77, see particularly FIG. 4. With this arrangement, and responsive to rotary movement of the cam shaft 77, the valve elements 70 are opened, or moved to open position, in succession, and thereafter closed in succession as their respective cam follower portions 75 are engaged and disengaged by respective cams 76.

Step by step rotary movement is imparted to the cam shaft 77, responsive to rotation of the tublar body 44 and parts carried thereby, by engagement of a rotary ratchet 80 with the pawl 41. The ratchet 80 is keyed or otherwise rigidly mounted on the lower end of the cam shaft 77, and is provided with a number of ratchet teeth 81 that correspond in number to the number of cams 76. As shown by broken lines in FIG. 5, a ratchet tooth 81 is engaged by the pawl 41 at each revolution of the tubular body 44, so that a single valve 70 is moved to its open position at each revolution of the tubular body 44. A pair of spring biased detent elements 82 are mounted on the radial arm portion 46 at diametrically opposite sides of the ratchet 80, and engage notches 83 in the ratchet 80 to releasably hold the cam shaft 77 in stepped positions of rotation thereof. At each step of rotary movement of the ratchet 80, a cam 76 releases its engaged cam follower portion to permit closing of its respective valve element 70 while the next succeeding cam 76 engages its cooperating cam follower portion 75 to open its respective valve element 70.

Figure 9:
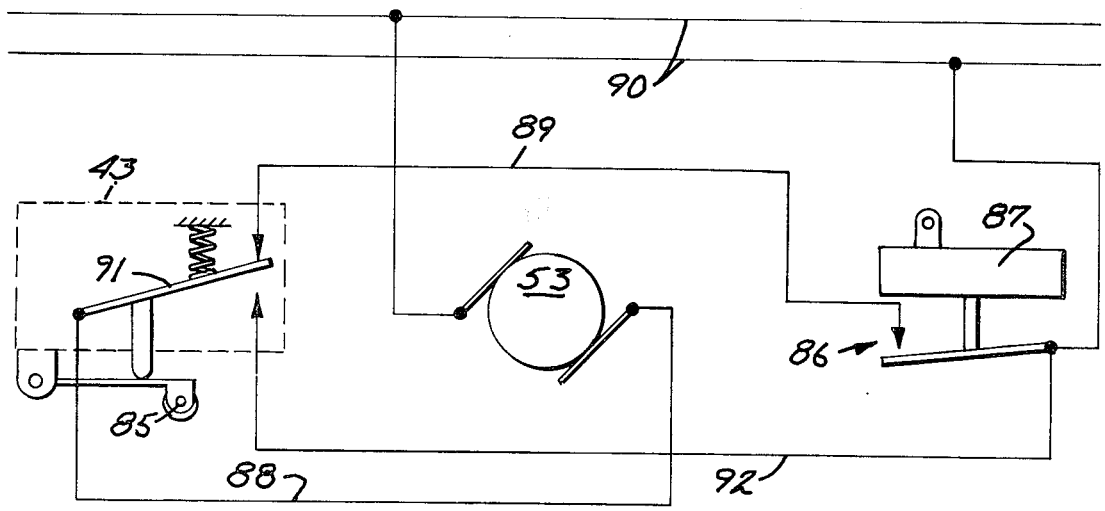
FIG. 9 is a schematic diagram.

An actuator 84 is mounted on the ratchet 80 for common rotation therewith and is adapted to engage a switch operating arm 85 on the switch 43 at a given position of rotary movement of the ratchet 80, to de-energize the motor 53. The switch actuator 84 is so positioned that the motor 53 is de-energized after all of the valves 70 have been opened and closed in succession in a single cycle, or when the ratchet 80 has partaken of a full revolution. An example of control circuit containing the switch 43 is shown in FIG. 9, in connection with the motor 53, the circuit also including a switch 86 that is operated by a conventional sensor 87 which may be assumed to be responsive to predetermined differential in pressure between the opposite sides 21 and 22 of the filter element 17. In the diagram illustrated, a pair of primary leads 88 and 89 are shown as extending from opposite sides of a two wire power conductor 90. The motor 53 is interposed in the lead 88 which extends to a movable conductor arm 91 of the switch 43. The switch 86 is interposed in the lead 89 that extends to one terminal of the switch 43 that is engaged by the conductor arm 91, and a circuit holding lead 92 extends from the switch 86 to a second terminal in switch 43 to hold the motor 53 energized when the switch 86 is opened.

OPERATION

During normal operation of the air cleaner, air enters the cleaner through the deflector 24 and moves through the inlet chamber 23 in a helical direction and generally radially inwardly through the filter element 17, dust particles being deposited on the outer surface of the filter element 17. At this point, it may be assumed that clean air under pressure is available to the interior of the interior of the tubular leg 33, conduit 47, fitting 65, tubular arm 65 and into manifold 60 from a suitable source, not shown. Also, during normal filtering operation of the filter 11, all of the valve elements 70 are in their closed positions, and the motor 53 is de-energized. Also, during non-cleaning periods of operation of the filter 11, the switch 86 is open and the conductor arm 91 is in contact with the adjacent terminal of the lead 89 within the switch 43, being held in this position by engagement of the switch operating arm 85 by the switch actuator 84. When a build-up of dust on the outer side 21 of the filter 17 reaches a point where a predetermined pressure differential exists between the inlet chamber 23 and the inner side of the filter 17, the sensor 87 will operate to cause the switch 86 to be closed, thus closing a circuit through the motor 53 to impart rotation to the body 44 and movement of the manifold 60 circumferentially around the inner side 22 of the filter element 17. As soon as the switch actuator 84 moves out of engagement with the operating arm 85, the conductor arm 91 will move into contact with the terminal of the holding lead 92 to maintain energization of the motor 53. As the tubular body 44 and its arm portion 46 rotate, one of the ratchet teeth 81 will engage the pawl 41 and be rotated thereby to cause one of the cams 76 to open its respective valve element 70. Preferably, the initially opened valve 70 will be at one end or the other of the manifold 60. Air under pressure then flows outwardly through the opened aperture 61 and impinges against the adjacent inner surface portion of the filter element 17, flowing through the porous material of the element to dislodge dust on the outer surface of the filter element. The vertical length of the opened aperture 61 is a relatively small fraction of the full vertical length of the filter element, the width of each slot like aperture 61 being very small in proportion to the circumferential extent of the inner side of the filter element 17. Thus, the reverse jet of air directed against the inner side 22 of the filter element occupies a very small area, so as to have a minimum effect on the filtering operation. As the tubular body 44 and parts carried thereby complete a full revolution within the filter element 17, a succeeding ratchet tooth 81 engages the pawl 41 to impart another step of rotation to the cam shaft 77. During this subsequent step of rotation, the first cam 76 moves out of engagement with its respective cam follower portion 75 permitting its respective valve element 70 to move into closing relationship with the first discharge aperture 61 and the second cam 76 engages its respective cam follower portion 75 to open its respective valve element 70. It will here be noted that, during the first rotational step of the ratchet 80, the acutator 84 moves circumferentially with the ratchet 80, the actuator 84 moves circumferentially with the ratchet 80 so that it does not engage the switch operating arm 85 during the second and other succeeding rotary steps of the ratchet 80. The filter cleaning operation continues in step by step fashion, each complete revolution resulting in the cleaning of a circumferential band or strip of the filter element 17. It will further be noted, that with the above described control circuit, should the switch 86 be opened by a reduction in pressure differential, due to partial cleaning of the filter element 17, the motor 53 will stay energized through the lead 92 until the entire filter element 17 has been subject to the reverse jet of air through all of the discharge apertures 61 in succession. When the ratchet 80 has been rotated to cause the last of the apertures 61 in the succession thereof to be opened, the switch actuator 84 will again be positioned to engage the switch operating arm 85 upon substantially a full rotation of the housing 44 and circumferential movement of the manifold 60. The switch arm 91 will then be moved into engagement with the terminal of the lead 89, causing the motor 53 to be de-energized until such time as required by further build up of dust on the outer surface 21 of the filter element 17.

With the fluid flow modulator construction above described, we are enabled to produce a manifold of relatively small diameter so as to occupy a minimum of space within the filter and yet having sufficient wall thickness to have extreme rigidity and strength. Further, we have been enabled to produce the springs 71 from relatively thin flexible resilient material which enables the valve elements 70 to be moved to their opened positions with little effort, pressure of air within the manifold aiding the springs 71 in holding the unopened valve elements in their valve closed positions.

While we have shown and described a commercial embodiment of our fluid filter cleaner and fluid flow modulator, it will be understood that the same is capable of modification, and that modification may be made without departure from the spirit and scope of the invention, as defined in the claims.

I claim:

1. A fluid flow modulator for a manifold having a row of longitudinally aligned slot-like fluid discharge apertures, said modulator comprising a plurality of valve elements each for a different one of said apertures, means yieldingly urging said valve elements toward valve closing relationship with their respective apertures, a cam shaft journaled in said manifold, a plurality of cams on said cam shaft, and a plurality of cam follower portions each operatively associated with a different one of said valve elements and each engaging a different one of said cams to open said valve elements in a given succession responsive to rotation of said cam shaft.

2. The fluid flow modulator defined in claim 1, characterized by means for imparting step by step rotary movement to said cam shaft and comprising a toothed ratchet wheel on said cam shaft and a cooperating pawl mounted for engagement with said ratchet wheel.

3. In a fluid cleaner including a filter element having opposite fluid receiving upstream and fluid delivery downstream sides;
   a. fluid delivery means for delivering a jet flow of fluid against said downstream side of the filter element reverse to that of the normal flow of fluid through said filter element;
   b. said fluid delivery means including an elongated manifold extending in one direction across said delivery side of the filter element;

c. said manifold having longitudinally extending discharge aperture means directed toward said filter element;
d. means for imparting movement to said manifold in a direction transversely of the longitudinal dimension thereof over the area of said downstream side of the filter element;
e. and a fluid flow modulator for said fluid delivery means, comprising:
 1. a plurality of valve elements operatively associated with said aperture means and each independently movable toward and away from aperture closing relationship with a different portion of said aperture means;
 2. and means responsive to said movement of the manifold for imparting valve opening movement to said valve elements in a given succession.

4. The fluid flow modulator defined in claim 3, characterized by yielding means urging said valve elements in a valve closing direction; said means for imparting valve opening movements to the valve elements comprising a rotary cam shaft, a plurality of cams on said cam shaft, and a plurality of cam follower portions each operatively associated with a different one of said valve elements and each engaging a different one of said cams, responsive to rotation of said cam shaft, to open its respective valve element against bias of said yielding means.

5. The fluid flow modulator defined in claim 4 in which said means for imparting valve opening movements to said valve elements further comprises a ratchet mounted on said cam shaft for rotation therewith and having circumferentially spaced teeth, and a stationary pawl mounted in the path of rotary movement of said ratchet teeth to impart limited rotary movement to said cam shaft responsive to said movements of the manifold across said delivery side of the filter element.

6. The fluid flow modulator defined in claim 5, characterized by a drive motor for imparting said movements to the manifold, means including a switch for controlling said motor, and a switch actuator mounted on said ratchet for common rotation therewith, said switch being disposed in the path of movement of said actuator in a given position of rotary movement of said ratchet for engagement by said actuator to de-energize said motor.

7. The fluid flow modulator defined in claim 3 in which said manifold comprises a rigid tube, said aperture means comprising a plurality of slots extending longitudinally of said tube and aligned longitudinally of said tube.

8. The fluid flow modulator defined in claim 7 in which said valve elements are disposed within said tube, characterized by yielding means urging said valve elements toward their valve closed positions.

9. The fluid flow modulator defined in claim 8 in which said means for imparting valve opening movements to said valve elements comprises a cam shaft extending axially within said manifold and journaled therein, cams on said cam shaft, and cam follower portions each operatively associated with a different one of said valve elements and each engaging a different one of said cams.

10. In a fluid cleaner including a housing and an annular filter element mounted in the housing and having cylindrical outer and inner fluid receiving upstream and fluid delivering downstream sides, respectively;
a. fluid delivery means in the housing for delivering a jet flow of fluid against the downstream side of the filter in a direction reverse to that of the normal flow of fluid through said filter element;
b. said fluid delivery means including an elongated manifold extending in a direction parallel to the axis of said filter element and adjacent the inner cylindrical side of the filter element;
c. said manifold having longitudinally extending discharge aperture means directed toward said filter element;
d. means mounting said manifold in said housing for circumferential movement within said filter element concentric therewith, and including an axial conduit journaled in the housing coaxially with said filter element, and radial arms connecting opposite ends of said circuit with respective ends of said manifold, one of said arms defining a fluid passageway between said conduit and manifold;
e. means for imparting rotation to said conduit including a motor within said conduit;
f. and a fluid flow modulator for said fluid delivery means, comprising:
 1. a plurality of valve elements operatively associated with said aperture means and each independently movable toward and away from aperture closing relationship with a different portion of said aperture means;
 2. and means responsive to said circumferential movement of the manifold for imparting valve opening movement to said valve element in a given succession.

11. The fluid flow modulator defined in claim 10 in which said manifold comprises a rigid tube, said aperture means comprising a plurality of slots extending longitudinally of said tube and aligned longitudinally of said tube.

12. The fluid flow modulator defined in claim 11 in which said valve elements are disposed within said tube, characterized by yielding means individually supporting said valve elements and urging said valve elements toward their valve closed positions.

13. The fluid flow modulator defined in claim 12 in which said means for imparting valve opening movements to said valve elements comprises a cam shaft extending axially within said manifold tube and journaled therein, cams on said cam shaft, and cam follower portions each operatively associated with a different one of said valves and each engaging a different one of said cams.

14. The fluid flow modulator defined in claim 13, characterized by a ratchet mounted on said cam shaft for rotation therewith and having circumferentially spaced teeth, and a stationary pawl mounted in said housing in the path of said of rotary movement of said ratchet teeth to impart limited rotary movement to said cam shaft responsive to rotary movement of said conduit and manifold.

* * * * *